(12) United States Patent
Schiff et al.

(10) Patent No.: US 8,278,897 B2
(45) Date of Patent: Oct. 2, 2012

(54) POWER SUPPLY CONVERTER AND METHOD

(75) Inventors: Tod Schiff, Portland, OR (US); Brian P. Johnson, Cedar Park, TX (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/641,173

(22) Filed: Dec. 17, 2009

(65) Prior Publication Data

US 2011/0148377 A1    Jun. 23, 2011

(51) Int. Cl.
    *G05F 1/00*      (2006.01)
(52) U.S. Cl. ............................ 323/283; 323/284; 323/285
(58) Field of Classification Search .................. 323/223, 323/224, 235, 271, 351, 281–284
See application file for complete search history.

(56) References Cited

U.S. PATENT DOCUMENTS

| | | | | |
|---|---|---|---|---|
| 5,072,171 A * | 12/1991 | Eng | ............... | 323/283 |
| 6,583,610 B2 * | 6/2003 | Groom et al. | .................. | 323/288 |
| 7,705,579 B1 * | 4/2010 | Hariman et al. | .............. | 323/284 |
| RE43,291 E * | 4/2012 | Groom | ........................... | 323/271 |
| 2008/0246455 A1 * | 10/2008 | Chu et al. | ....................... | 323/283 |
| 2009/0174379 A1 * | 7/2009 | Lima et al. | ..................... | 323/282 |
| 2009/0184701 A1 * | 7/2009 | Yen | ................................. | 323/283 |
| 2009/0218998 A1 * | 9/2009 | Huang et al. | .................. | 323/282 |
| 2010/0194370 A1 * | 8/2010 | Cheng | ............................ | 323/285 |

OTHER PUBLICATIONS

Texas Instruments, "Predictive Gate Drive Frequently Asked Questions", Application Report, SLUA285—Feb. 2003.

* cited by examiner

*Primary Examiner* — Gary L Laxton
*Assistant Examiner* — Gustavo Rosario Benitez
(74) *Attorney, Agent, or Firm* — Rennie William Dover (57) ABSTRACT

A power supply converter and a method for adjusting a threshold voltage in the power supply converter. The circuit includes first and second switches having current conducting terminals commonly connected together to form a node. An energy storage element may be connected to the node and a zero current detection comparator may be connected to the node. A first voltage may be provided at the control terminal of the first switch that turns it off. After the first switch is off, determining whether the first switch turned off before or after the current in the energy storage element has reached zero. This may be accomplished by determining whether the voltage at the first node is positive or negative. If the voltage at the first node is negative, the threshold voltage is increased and if the voltage at the first node is positive the threshold voltage is decreased.

20 Claims, 5 Drawing Sheets

POWER SUPPLY CONVERTER AND METHOD

TECHNICAL FIELD

The present invention relates, in general, to power supplies and, more particularly, to switching mode power supplies.

BACKGROUND

Switching Mode Power Supplies (SMPS) are used in a variety of electronic devices including laptop computers, cellular phones, personal digital assistants, video games, video cameras, etc. They may convert a dc signal at one voltage level to a dc signal at a different voltage level (this is a dc-dc converter), an Alternating Current (ac) signal to a dc signal (this is a an ac-dc converter), a dc signal to an ac signal (this is a dc-ac converter), or an ac signal to an ac signal (this is an ac-ac converter). Generally, switching mode power supplies transfer energy from an input node to an output node by means of a switch, an inductor, and control and feedback circuitry. One type of switching mode power supply topology is a Buck converter in which the voltage appearing at the output node is stepped down from the voltage appearing at the input node. A Buck converter may include a high side Field Effect Transistor (FET) and a low side FET, where the drain of the high side FET is coupled for receiving an input signal, the source of the high side FET is commonly connected to the drain of a low side FET and to a terminal of an inductor, and the source of the low side FET is connected to ground. The gates of the high and low side FETs are coupled for receiving corresponding control signals. The other terminal of the inductor is connected to a load.

To optimize the efficiency of a converter such as, for example, a buck converter, it is desirable to prevent a negative current from flowing in the low side FET because the negative current increases conduction losses from the FET which results in an increased power loss. Thus, a Buck converter is typically operated in a discontinuous operating mode to reduce conduction losses. In this operating mode the low side FET is turned off when the inductor current reaches zero. A drawback with turning off the low side FET is that if it is turned off before the inductor current reaches zero, current continues to flow through the body diode of the low side FET which increases power losses. Conversely, if the low side FET is turned off too late, a negative inductor current causes current to flow through the body diode of the high side FET that is off, which causes the converter circuit to ring thereby producing ElectroMagnetic Interference (EMI).

Accordingly, it would be advantageous to have a method and circuit for adaptively adjusting the turn off of the low side FET in a switching mode power supply. It would be of further advantage for the circuit and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Generally, the present invention provides a circuit and a method for operating a switching transistor in a discontinuous mode. In accordance with embodiments of the present invention, a high side switching transistor has a drain coupled for receiving an input signal, a source commonly connected to a drain of a low side switching transistor, to an input of a comparator, and to an inductor to form a switch node. The source of the low side switching transistor is coupled for receiving a source of operating potential such as for example, operating potential $V_{SS}$. The other input of the comparator is coupled for receiving a threshold voltage and the other terminal of the inductor is coupled to a load. The switching transistors are coupled for receiving control signals from a switch drive module. The voltage at the switch node is compared with the threshold voltage. If the voltage at the switch node is negative, there is a positive current flowing through the inductor and the zero current detector generates a control signal that raises the threshold voltage so that the low side switching transistor turns off later. If the voltage at the switch node is positive, there is a negative current flowing through the inductor and the zero current detector generates a control signal that decreases the threshold voltage so that the low side switching transistor turns on earlier. In other words, if the inductor current is negative, the low side switching transistor turns off too late, i.e., the low side switch opens too late, and if the inductor current is positive, the low side switching transistor turns off too early, i.e., the low side switch opens too early.

Figure 1:
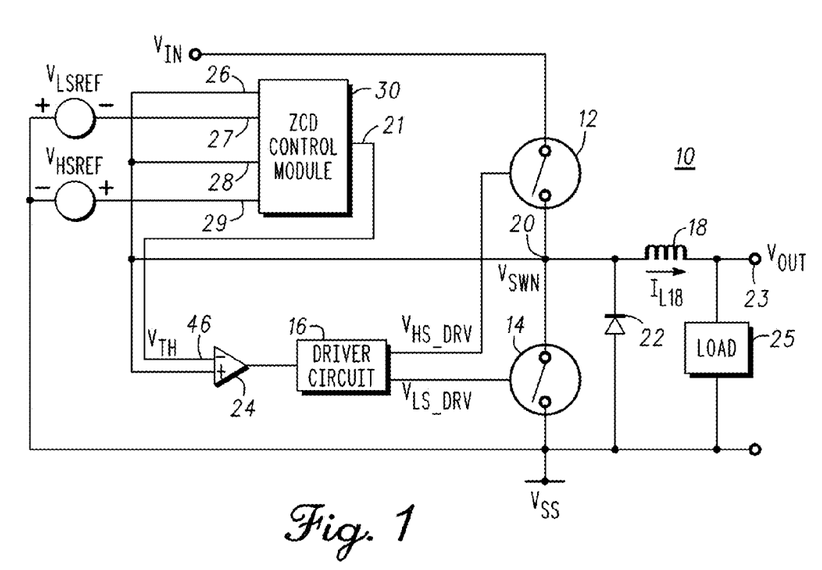
FIG. 1 is a circuit schematic of a converter in accordance with an embodiment of the present invention.

FIG. 1 is a schematic diagram of a converter 10 suitable for use with a power supply in accordance with an embodiment of the present invention. Converter 10 includes switches 12 and 14 coupled for receiving control signals $V_{HS\_DRV}$ and $V_{LS\_DRV}$, respectively, from a driver circuit 16. It should be noted that driver circuit 16 may also be referred to as a switch drive module. More particularly, switches 12 and 14 have control terminals connected to corresponding output terminals of driver circuit 16 for receiving high side drive signal $V_{HS\_DRV}$ and low side drive signal $V_{LS\_DRV}$, respectively. Switches 12 and 14 have current conducting terminals connected to each other. In addition, switch 12 has a current conducting terminal coupled for receiving an input voltage $V_{IN}$ and switch 14 has a current conducting terminal coupled for receiving a source of operating potential $V_{SS}$. By way of example, source of operating potential $V_{SS}$ is at ground potential. An energy storage element 18 such as, for example, an inductor, is coupled to the commonly connected current conducting terminals of switches 12 and 14, which forms a node 20. An current $I_{L18}$ flows through energy storage element 18. A diode 22 may be coupled between node 20 and source of operating potential $V_{SS}$. A load 25 is coupled between an output terminal 23 of converter 10 and source of operating potential $V_{SS}$. An output voltage $V_{OUT}$ appears at output terminal 23.

Converter 10 includes a Zero Current Detection (ZCD) comparator 24 having an inverting input terminal 46, a noninverting input terminal, and an output terminal. The noninverting input terminal of ZCD comparator 24 is connected to node 20 for receiving a switching signal $V_{SWN}$ that serves as a reference voltage for ZCD comparator 24, inverting input terminal 46 of ZCD comparator 24 is coupled for receiving a signal $V_{TH}$ that serves as an adjustable threshold signal, and the output terminal is connected to an input terminal of driver circuit 16. By way of example, switching signal $V_{SWN}$ and adjustable threshold signal $V_{TH}$ are voltage signals.

Converter 10 further includes a Zero Current Detection (ZCD) control module 30 having a plurality of input terminals and at least one output terminal. An output terminal 21 of control module 30 is connected to inverting input terminal 46 of ZCD comparator 24 for transmitting an adjustable threshold voltage $V_{TH}$ to comparator 24. Input terminals 26 and 28 of ZCD control module 30 and the noninverting input terminal of ZCD comparator 24 are connected to node 20. An input terminal 27 of ZCD control module 30 is coupled for receiving a reference voltage $V_{LSREF}$ and an input terminal 29 of ZCD control module 30 is coupled for receiving a reference voltage $V_{HSREF}$.

Figure 2:
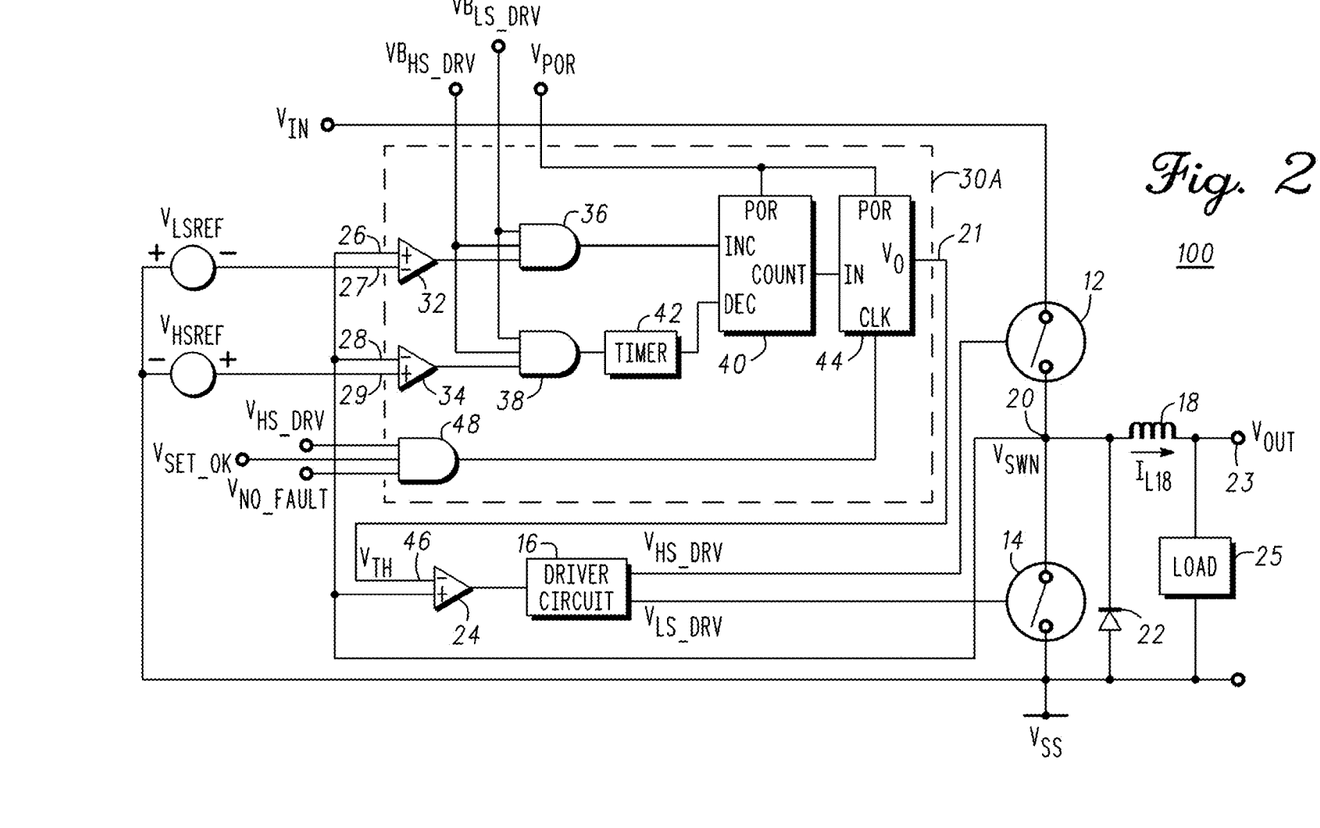
FIG. 2 is a circuit schematic of a converter in accordance with another embodiment of the present invention.

FIG. 2 is a schematic diagram of a converter 100 suitable for use with a power supply in accordance with another embodiment. What is shown in FIG. 2 is an embodiment of a ZCD control module 30A coupled to switches 12 and 14, ZCD comparator 24, and driver circuit 16. It should be noted that the ZCD control module has been identified by reference character 30A in FIG. 2 to indicate that it may be configured differently from ZCD control module 30 described with reference to FIG. 1. Thus, reference character 30 has been preserved to identify ZCD control modules but reference character "A" has been appended to reference character 30 to indicate that the configurations of ZCD control modules 30 and 30A may be the same or they may be different. Control module 30A comprises comparators 32 and 34, where comparator 32 has a noninverting input terminal connected to node 20 and an inverting input terminal connected to reference voltage source $V_{LSREF}$ and comparator 34 has an inverting input terminal connected to node 20 and a noninverting input terminal connected to reference voltage source $V_{HSREF}$. Thus, the noninverting input terminal of comparator 32 and the inverting input terminal of comparator 34 serve as input terminals 26 and 28, respectively, of ZCD control module 30 and the inverting terminal of comparator 32 and the noninverting input terminal of comparator 34 serve as input terminals 27 and 29, respectively, of ZCD control module 30. An output terminal of comparator 32 is connected to an input terminal of a three-input AND gate 36 and an output terminal of comparator 34 is connected to an input terminal of a three-input AND gate 38. A second input terminal of AND gate 36 is connected to a second input terminal of AND gate 38, which second input terminals are commonly connected together for receiving a signal $VB_{LS\_DRV}$ that serves as a control signal and a third input terminal of AND gate 36 is connected to a third input terminal of AND gate 38, which are commonly connected for receiving a signal $VB_{HS\_DRV}$ that serves as another control signal. Signal $VB_{LS\_DRV}$ indicates that low side switch 14 is off or open and signal $VB_{HS\_DRV}$ indicates that high side switch 14 is off or open. Signals $VB_{HS\_DRV}$ and $VB_{LS\_DRV}$ are complementary signals to signals $V_{HS\_DRV}$ and $V_{LS\_DRV}$, respectively.

An output terminal of AND 36 is connected to an incrementing input terminal of a counter 40 and an output terminal of AND gate 38 is coupled to a decrementing input terminal of counter 40 through a timer 42. It should be noted that timer 42 is an optional element and that the output terminal of AND gate 38 can be directly connected to the decrementing input terminal of counter 40. An output terminal of counter 40 is connected to an input terminal of a latch 44. The output terminal of latch 44 is connected to an inverting input terminal 46 of comparator 24. Counter 40 and latch 44 have input terminals coupled for receiving a power on reset signal $V_{POR}$. Latch 44 has a clocking input terminal coupled to an output terminal of a three-input AND gate 48 which has an input terminal coupled for receiving a high side drive signal $V_{HS\_DRV}$, an input terminal coupled for receiving a signal $V_{SFT\_OK}$, which indicates whether a soft start has completed correctly, and an input terminal coupled for receiving a signal $V_{NO\_FAULT}$ which indicates that no fault conditions have been detected during start up or during operation. Examples of fault conditions include an over current event, an over voltage event, excessively high power dissipation, or the like. AND gates 36, 38, and 48 may be referred to as logic gates.

Figure 3:
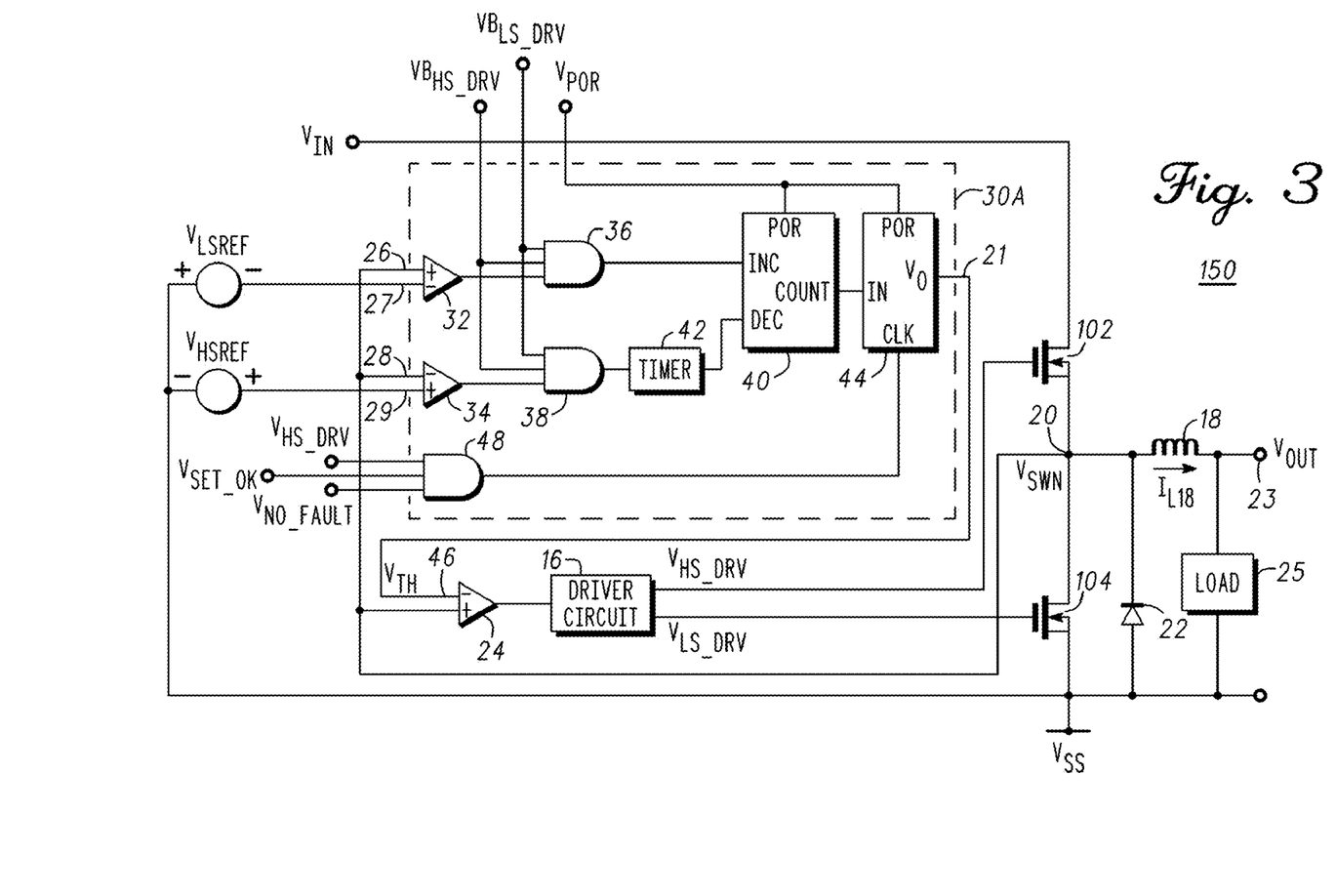
FIG. 3 is a circuit schematic of a converter in accordance with another embodiment of the present invention.

FIG. 3 is a schematic diagram of a converter 150 suitable for use with a power supply in accordance with another embodiment. Converter 150 is similar to converter 100 except that switches 12 and 14 have been implemented using n-channel field effect transistors 102 and 104. Field effect transistors 102 and 104 have gate electrodes coupled for receiving control signals from driver circuit 16. Field effect transistor 102 has a drain electrode coupled for receiving input signal $V_{IN}$ and a source electrode coupled to a drain electrode of field effect transistor 104. The source electrode of field effect transistor 104 is coupled for receiving source of operating potential $V_{SS}$. It should be noted that the gate electrode of a field effect transistor may be referred to as a control electrode and the source and drain electrodes of a field effect transistor may be referred to as current conducting electrodes.

Figure 4:
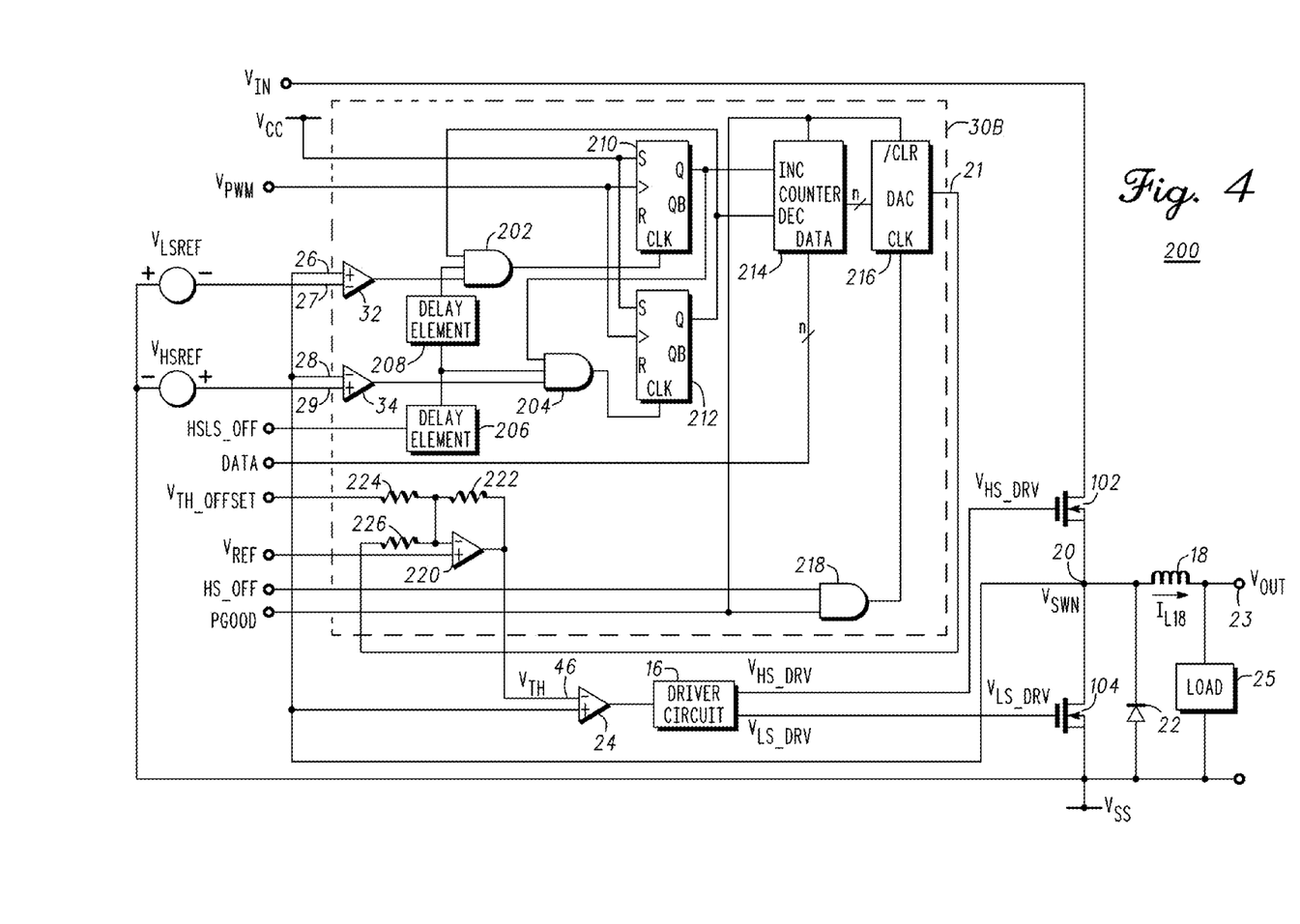
FIG. 4 is a circuit schematic of a converter in accordance with another embodiment of the present invention.

FIG. 4 is a schematic diagram of a converter 200 suitable for use with a power supply in accordance with another embodiment. Converter 200 includes ZCD comparator 24, comparators 32 and 34, driver circuit 16, field effect transistors 102 and 104, inductor 18, and diode 22. Like converters 10, 100, and 150, diode 22 is an optional element. It should be noted that switches such as, for example, switches 12 and 14 may be used in place of switching transistors 102 and 104, respectively. What is shown in FIG. 4 is an embodiment of a ZCD control module 30B coupled to transistors 102 and 104, ZCD comparator 24, and driver circuit 16. It should be noted that the ZCD control module has been identified by reference character 30B in FIG. 4 to indicate that it may be configured differently from ZCD control module 30 described with reference to FIG. 1. Thus, reference character 30 has been preserved to identify ZCD control modules but reference character "B" has been appended to reference character 30 to indicate that the configurations of ZCD control modules 30 and 30B may be the same or they may be different. Control module 30B comprises comparators 32 and 34 where comparator 32 has an output terminal connected to an input terminal of a three-input AND gate 202 and comparator 34 has an output terminal connected to an input terminal of a three-input AND gate 204. A delay element 206 has an input terminal coupled for receiving a control signal HSLS_OFF and an output terminal commonly connected to a second input terminal of AND gate 204 and to an input terminal of a delay element 208. Control signal HSLS_OFF indicates whether transistors 102 and 104 are on or off, i.e., whether the switches are closed or open. Delay element 208 has an output terminal connected to a second input terminal of three input AND gate 202. An output terminal of AND gate 202 is connected to a clocking input terminal of a flip-flop 210. In addition, flip-flop 210 has a set input terminal coupled for receiving a source of operating potential such as, for example, $V_{CC}$, an edge triggered data input terminal coupled for receiving a Pulse Width Modulation (PWM) signal $V_{PWM}$, and a data output terminal connected to the incrementing input terminal of a counter 214. An output terminal of AND gate 204 is connected to a clocking input terminal of a flip-flop 212. In addition, flip-flop 212 has a set input terminal coupled for receiving a source of operating potential such as, for example, $V_{CC}$, an edge triggered data input terminal coupled for receiving PWM signal $V_{PWM}$, and a data output terminal connected to the decrementing input terminal of counter 214.

Counter 214 has a set of n data input terminals coupled for receiving an n-bit input signal DATA, where n is an integer and a set of n output terminals for transmitting an n-bit output signal to a Digital-to-Analog Converter (DAC) 216. DAC 216 further includes a status input terminal coupled to a status input terminal of counter 214 and coupled for receiving a control signal PGOOD which indicates whether there has been a fault or soft start error during system startup. DAC 216 further includes a clocking input terminal coupled to an output terminal of a two input AND gate 218, where one of the input terminals of AND gate 218 is coupled for receiving input signal PGOOD and the other input terminal is coupled for receiving a control signal HS_OFF, which indicates whether transistor 102 is on or off.

Converter 200 further includes an operational amplifier 220 configured as a summer. More particularly, operational amplifier 220 has an inverting input terminal, a noninverting input terminal, and an output terminal, where the inverting input terminal is coupled to the output terminal through a resistor 222. The output terminal of operational amplifier 220 is also connected to inverting input terminal 46 of ZCD comparator 24. The inverting input terminal of operational amplifier 220 is coupled for receiving a threshold offset voltage $V_{TH\_OFFSET}$ through a resistor 224, and coupled to the output terminal of DAC 216 through a resistor 226.

Figure 5:
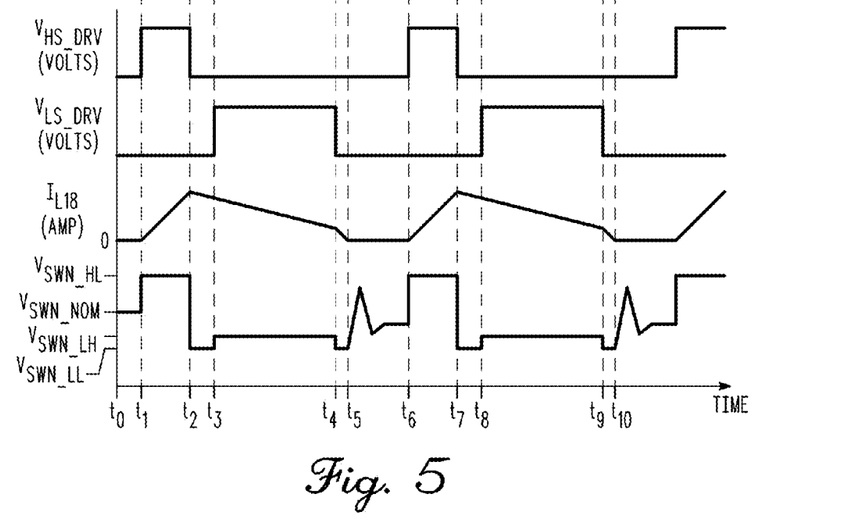
FIG. 5 is a graph having plots that illustrate signals that are generated at various nodes in accordance with embodiments of the present invention.

FIG. 5 is a timing diagram 250 illustrating electrical signals at various nodes of converters 10, 100, 150, and 200 (shown in FIGS. 1, 2, 3, and 4, respectively) during their operation in accordance with embodiments of the present invention. More particularly, timing diagram 250 illustrates voltage $V_{HS\_DRV}$ at the control terminal of switching transistor 102, voltage $V_{LS\_DRV}$ at the control terminal of switching transistor 104, current $I_{L18}$ flowing through inductor 18, and voltage $V_{SWN}$ at switching node 20 under a condition in which switching voltage $V_{SWN}$ is negative and inductor current $I_{L18}$ is positive. Under this condition, switching transistor 104 turns off before inductor current $I_{L18}$ reaches zero. Thus, it is desirable to raise threshold voltage $V_{TH}$ that appears at input terminal 46 of ZCD comparator 24 so that switching transistor 104 turns off later, i.e., to delay switching transistor 104 turning off. Thus, converters 10, 100, 150, and 200 operate to increase the threshold voltage $V_{TH}$ that appears at input terminal 46 of ZCD comparator 24.

Driver circuit 16 provides switching signals that turn on and turn off switching transistors 102 and 104, i.e., close and open the switching transistors. It should be noted that in embodiments where switches such as, for example switches 12 are used rather switching transistors 102 and 104, respectively, driver circuit 16 provides switching signals that close and open switches 12 and 14. Preferably, driver circuit 16 generates drive signals $V_{HS\_DRV}$ and $V_{LS\_DRV}$ such that they are not at a logic high voltage level at the same time thereby ensuring that transistors 102 and 104 are not on at the same time, i.e., the switches are not closed at the same time. This precludes the possibility of input voltage $V_{IN}$ being shorted to source of operating potential $V_{SS}$, which is typically at ground potential. Optionally, driver circuit 16 can be configured to generate drive signals that are complementary signals to drive signals $V_{HS\_DRV}$ and $V_{LS\_DRV}$.

At time $t_0$, driver circuit 16 generates control signals $V_{HS\_DRV}$ and $V_{LS\_DRV}$ that change the operating states of switching transistors 102 and 104 by turning them off or turning them on. In this example, driver circuit has generated control signals that have turned switching transistors 102 and 104 off at time $t_0$, i.e., control signals $V_{HS\_DRV}$ and $V_{LS\_DRV}$ are at logic low voltage levels. Inductor current $I_{L18}$ is zero and switching voltage $V_{SWN}$ is at a nominal level $V_{SWN\_NOM}$. Nominal voltage level $V_{SWN\_NOM}$ is derived using a voltage divider relationship among switching transistors 102 and 104, input voltage $V_{IN}$, and voltage $V_{SS}$.

At time $t_1$ high side drive signal $V_{HS\_DRV}$ transitions from a logic low voltage level to a logic high voltage level while low side drive signal $V_{LS\_DRV}$ remains at a logic low voltage level. In response to high side drive signal $V_{HS\_DRV}$ transitioning to a logic high voltage level and low side drive signal $V_{LS\_DRV}$ remaining at a logic low voltage level, voltage $V_{SWN}$ at switching node 20 transitions to a voltage level $V_{SWN\_HL}$, which is greater than reference voltages $V_{LSREF}$ and $V_{HSREF}$ and close to the value of input voltage $V_{IN}$. A positive inductor current $I_{L18}$ flows from node 20 through inductor 18 and load 25.

At time $t_2$, driver circuit 16 generates a control signal that turns FET 102 off and a control signal that leaves FET 104 off. In particular, gate voltage $V_{HS\_DRV}$ of switching transistor 102 transitions to a logic low voltage level and gate voltage $V_{LS\_DRV}$ of switching transistor 104 remains at a logic low voltage level. In response to the change in high side drive signal $V_{HS\_DRV}$ at time $t_2$, output voltage $V_{OUT}$ decreases which results in switch node voltage $V_{SWN}$ at node 20 decreasing to voltage level $V_{SWN\_LL}$ and inductor current $I_{L18}$ beginning to decrease. Switch node voltage $V_{SWN}$ is less than reference voltages $V_{LSREF}$ and $V_{LSREF}$, which leaves decrement signal $V_{DEC}$ and increment signal $V_{INC}$ that are input into counter 214 and threshold voltage $V_{TH}$ that appears at input terminal 46 of comparator 24 unchanged.

At time $t_3$, low side drive signal $V_{LS\_DRV}$ transitions to a logic high voltage level turning on switching transistor 104, i.e., closing the switch, which generates a drain-to-source on-voltage in switching transistor 104 and causes switch node voltage $V_{SWN}$ at node 20 to increase to a voltage level $V_{SWN\_LH}$. Inductor current $I_{L18}$ continues to decrease.

At time $t_4$, high side drive signal $V_{HS\_DRV}$ remains at a logic low voltage level and low side drive signal $V_{LS\_DRV}$ transitions from a logic high voltage level to a logic low voltage level. Low side drive signal $V_{LS\_DRV}$ being at a logic low voltage level turns off switching transistor 104 which causes switch node voltage $V_{SWN}$ at node 20 to decrease below voltage level $V_{SWN\_LH}$. This causes inductor current $I_{L18}$ to decrease at a faster rate as shown by the change in slope of the portion of the inductor current plot between times $t_4$ and $t_5$ in FIG. 5.

At time $t_5$, inductor current $I_{L18}$ reaches a zero value, i.e., current $I_{L18}$ stops flowing. Voltage $V_{SWN}$ oscillates about its nominal voltage $V_{SWN\_NOM}$ before settling to its nominal voltage.

After time $t_5$, signal $V_{SWN}$ at node 20 and pulse width modulation signal $V_{PWM}$ causes flip-flops 210 and 212 to generate a decrement signal that decrements counter 214 and adjusts threshold voltage $V_{TH}$ so that switching transistor 104 turns off earlier and preferably when switching current $I_{L18}$ reaches zero. In this example, although threshold voltage $V_{TH}$ appearing at input terminal 46 of ZCD comparator 24 has been increased, it has not been increased sufficiently so that inductor current $I_{L18}$ is zero or substantially zero when low side switching transistor 104 turns off. Thus, at time $t_6$ high side drive signal $V_{HS\_DRV}$ transitions from a logic low voltage level to a logic high voltage level while low side drive signal $V_{LS\_DRV}$ remains at a logic low voltage level. In response to high side drive signal $V_{HS\_DRV}$ transitioning to a logic high voltage level and low side drive signal $V_{LS\_DRV}$ remaining at a logic low voltage level, switch node voltage $V_{SWN}$ at switching node 20 transitions to a voltage level $V_{SWN\_HF}$, which is greater than reference voltages $V_{LSREF}$ and $V_{HSREF}$ and close to the value of input voltage $V_{IN}$. A positive inductor current $I_{L18}$ flows from node 20 through inductor 18 and load 25.

At time $t_7$, driver circuit 16 generates a control signal that turns FET 102 off and a control signal that leaves FET 104 off. In particular, gate voltage $V_{HS\_DRV}$ of switching transistor 102 transitions to a logic low voltage level and gate voltage $V_{LS\_DRV}$ of switching transistor 104 remains at a logic low voltage level. In response to the change in high side drive signal $V_{HS\_DRV}$ at time $t_7$, output voltage $V_{OUT}$ decreases which results in switch node voltage $V_{SWN}$ at node 20 decreasing to voltage level $V_{SWN\_LL}$ and inductor current $I_{L18}$ beginning to decrease. Switch node voltage $V_{SWN}$ is less than reference voltages $V_{HSREF}$ and $V_{LSREF}$, which leaves decrement signal $V_{DEC}$ and increment signal $V_{INC}$ that are input into counter 214 and threshold voltage $V_{TH}$ that appears at input terminal 46 of comparator 24 unchanged.

At time $t_8$, low side drive signal $V_{LS\_DRV}$ transitions to a logic high voltage level turning on switching transistor 104, i.e., closing the switch, which generates a drain-to-source on-voltage in switching transistor 104 and causes switch node voltage $V_{SWN}$ at node 20 to increase to a voltage level $V_{SWN\_LH}$. Inductor current $I_{L18}$ continues to decrease.

At time $t_9$, high side drive signal $V_{HS\_DRV}$ remains at a logic low voltage level and low side drive signal $V_{LS\_DRV}$ transitions from a logic high voltage level to a logic low voltage level. Low side drive signal $V_{LS\_DRV}$ being at a logic low voltage level turns off switching transistor 104 which causes switch node voltage $V_{SWN}$ at node 20 to decrease below voltage level $V_{SWN\_LH}$. This causes inductor current $I_{L18}$ to decrease at a faster rate as shown by the change in slope of the portion of the inductor current plot between times $t_4$ and $t_5$ in FIG. 5.

At time $t_{10}$, inductor current $I_{L18}$ reaches a zero value, i.e., current $I_{L18}$ stops flowing. Voltage $V_{SWN}$ oscillates about its nominal voltage $V_{SWN\_NOM}$ before settling to its nominal voltage.

This process continues, i.e., using signals $V_{SWN}$ and $V_{PWM}$ to generate counter decrement signals, until threshold voltage $V_{TH}$ appearing at input terminal 46 of comparator 24 is sufficiently increased so that low side switching transistor 104 turns off when inductor current $I_{L18}$ reaches zero or substantially zero.

Figure 6:
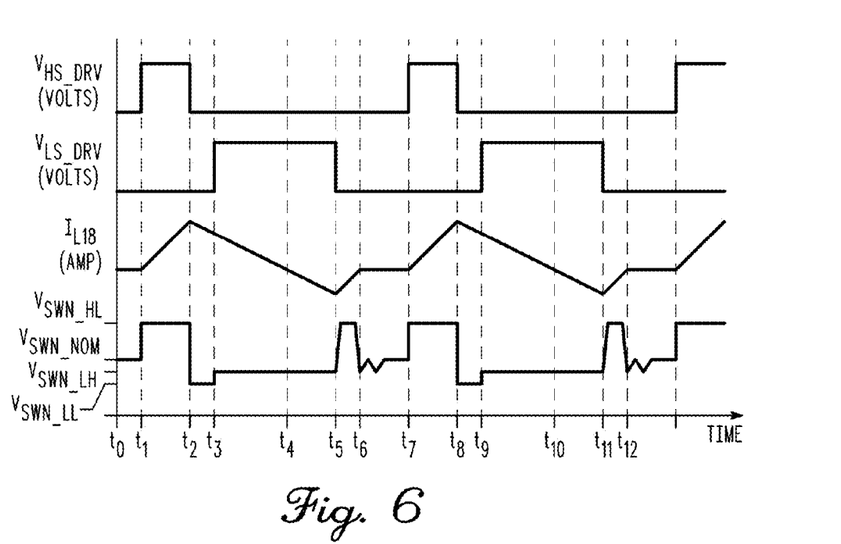
FIG. 6 is a graph having plots that illustrate signals that are generated at various nodes in accordance with embodiments of the present invention.

FIG. 6 is a timing diagram 300 illustrating electrical signals at various nodes of converters 10, 100, 150, and 200 (shown in FIGS. 1, 2, 3, and 4, respectively) during their operation in accordance with embodiments of the present invention. More particularly, timing diagram 300 illustrates voltage $V_{HS\_DRV}$ at the control terminal of switching transistor 102, voltage $V_{LS\_DRV}$ at the control terminal of switching transistor 104, current $I_{L18}$ flowing through inductor 18, and voltage $V_{SWN}$ at switching node 20 under a condition in which switching voltage $V_{SWN}$ is positive, inductor current $I_{L18}$ is negative, and switching transistor 104 turns off after inductor current $I_{L18}$ has reached zero. Thus, converters 10, 100, 150, and 200 operate to decrease the threshold voltage $V_{TH}$ that appears at input terminal 46 of ZCD comparator 24 so that switching transistor 104 turns off earlier.

As discussed above, driver circuit 16 provides switching signals that turn on and turn off switching transistors 102 and 104, i.e., close and open the switching transistors. Preferably, driver circuit 16 generates drive signals $V_{HS\_DRV}$ and $V_{LS\_DRV}$ such that they are not at a logic high level at the same time thereby ensuring that transistors 102 and 104 are not on at the same time, i.e., the switches are not closed at the same time. This precludes the possibility of input voltage $V_{IN}$ being shorted to source of operating potential $V_{SS}$, which is typically at ground potential. Although not shown, driver circuit 16 can also generate drive signals that are complementary signals to drive signals $V_{HS\_DRV}$ and $V_{LS\_DRV}$.

At time $t_0$, driver circuit 16 generates control signals $V_{HS\_DRV}$ and $V_{LS\_DRV}$ that change the operating states of switching transistors 102 and 104 by turning them off or turning them on. In this embodiment, driver circuit 16 has generated control signals that have turned switching transistors 102 and 104 off at time $t_0$, i.e., control signals $V_{HS\_DRV}$ and $V_{LS\_DRV}$ are at logic low voltage levels. Inductor current $I_{L18}$ is zero and switching voltage $V_{SWN}$ is at a nominal level $V_{SWN\_NOM}$. Nominal voltage level $V_{SWN\_NOM}$ is derived using a voltage divider relationship among switching transistors 102 and 104, input voltage $V_{IN}$, and voltage $V_{SS}$.

At time $t_1$ high side drive signal $V_{HS\_DRV}$ transitions from a logic low voltage level to a logic high voltage level while low side drive signal $V_{LS\_DRV}$ remains at a logic low voltage level. In response to high side drive signal $V_{HS\_DRV}$ transitioning to a logic high voltage level and low side drive signal $V_{LS\_DRV}$ remaining at a logic low voltage level, voltage $V_{SWN}$ at switching node 20 transitions to a voltage level $V_{SWN\_HL}$, which is greater than reference voltages $V_{LSREF}$ and $V_{HSREF}$ and close to the value of input voltage $V_{IN}$. A positive inductor current $I_{L18}$ flows from node 20 through inductor 18 and load 25.

At time $t_2$, driver circuit 16 generates a control signal that turns FET 102 off and a control signal that leaves FET 104 off. In particular, gate voltage $V_{HS\_DRV}$ of switching transistor 102 transitions to a logic low voltage level and gate voltage $V_{LS\_DRV}$ of switching transistor 104 remains at a logic low voltage level. In response to the change in high side drive signal $V_{HS\_DRV}$ at time $t_2$, output voltage $V_{OUT}$ decreases which results in switch node voltage $V_{SWN}$ at node 20 decreasing to voltage level $V_{SWN\_LL}$ and inductor current $I_{L18}$ beginning to decrease. Switch node voltage $V_{SWN}$ is less than reference voltages $V_{HSREF}$ and $V_{LSREF}$, which leaves decrement signal $V_{DEC}$ and increment signal $V_{INC}$ that are input into counter 214 and threshold voltage $V_{TH}$ that appears at input terminal 46 of comparator 24 unchanged.

At time $t_3$, low side drive signal $V_{LS\_DRV}$ transitions to a logic high voltage level turning on switching transistor 104, i.e., closing the switch, which generates a drain-to-source on-voltage in switching transistor 104 and causes switch node voltage $V_{SWN}$ at node 20 to increase to a voltage level $V_{SWN\_LH}$. Inductor current $I_{L18}$ continues to decrease.

At time $t_4$, high side drive signal $V_{HS\_DRV}$ remains at a logic low voltage level, low side drive signal $V_{LS\_DRV}$ remains at a logic high voltage level, and inductor current $I_{L18}$ transitions to become a negative current.

At time $t_5$, high side drive signal $V_{HS\_DRV}$ remains at a logic low voltage level and low side drive signal $V_{LS\_DRV}$ transitions from a logic high voltage level to a logic low voltage level. Low side drive signal $V_{LS\_DRV}$ being at a logic low voltage level turns off switching transistor 104 which causes switch node voltage $V_{SWN}$ at node 20 to increase to voltage level $V_{SWN\_HF}$. This causes inductor current $I_{L18}$ to become less negative.

At time $t_6$, inductor current $I_{L18}$ becomes zero causing switching node voltage $V_{SWN}$ to oscillate about its nominal voltage $V_{SWN\_NOM}$ before settling to its nominal voltage.

After time $t_6$, signal $V_{SWN}$ at node 20 and pulse width modulation signal $V_{PWM}$ causes flip-flops 210 and 212 to generate an increment signal that increments counter 214 and adjusts threshold voltage $V_{TH}$ so that switching transistor 104 turns off or changes state later and preferably when switching current $I_{L18}$ has reached zero. In this example, although threshold voltage $V_{TH}$ appearing at input terminal 46 of ZCD comparator 24 has been decreased, it has not been decreased sufficiently so that inductor current $I_{L18}$ is zero or substantially zero when low side switching transistor 104 turns off. Thus, at time $t_7$, high side drive signal $V_{HS\_DRV}$ transitions from a logic low voltage level to a logic high voltage level while low side drive signal $V_{LS\_DRV}$ remains at a logic low voltage level. In response to high side drive signal $V_{HS\_DRV}$ transitioning to a logic high voltage level and low side drive signal $V_{LS\_DRV}$ remaining at a logic low voltage level, voltage $V_{SWN}$ at switching node 20 transitions to a voltage level $V_{SWN\_HL}$, which is greater than reference voltages $V_{LSREF}$ and $V_{HSREF}$ and close to the value of input voltage $V_{IN}$. A positive inductor current $I_{L18}$ flows from node 20 through inductor 18 and load 25.

At time $t_8$, driver circuit 16 generates a control signal that turns FET 102 off and a control signal that leaves FET 104 off. In particular, gate voltage $V_{HS\_DRV}$ of switching transistor 102 transitions to a logic low voltage level and gate voltage $V_{LS\_DRV}$ of switching transistor 104 remains at a logic low voltage level. In response to the change in high side drive signal $V_{HS\_DRV}$ at time $t_2$, output voltage $V_{OUT}$ decreases which results in switch node voltage $V_{SWN}$ at node 20 decreasing to voltage level $V_{SWN\_LL}$ and inductor current $I_{L18}$ beginning to decrease. Switch node voltage $V_{SWN}$ is less than reference voltages $V_{LSREF}$ and $V_{LSREF}$, which leaves decrement signal $V_{DEC}$ and increment signal $V_{INC}$ that are input into counter 214 and threshold voltage $V_{TH}$ that appears at input terminal 46 of comparator 24 unchanged.

At time $t_9$, low side drive signal $V_{LS\_DRV}$ transitions to a logic high voltage level turning on switching transistor 104, i.e., closing the switch, which generates a drain-to-source on-voltage in switching transistor 104 and causes switch node voltage $V_{SWN}$ at node 20 to increase to a voltage level $V_{SWN\_LH}$. Inductor current $I_{L18}$ continues to decrease.

At time $t_{10}$, high side drive signal $V_{HS\_DRV}$ remains at a logic low voltage level, low side drive signal $V_{LS\_DRV}$ remains at a logic high voltage level, and inductor current $I_{L18}$ transitions to become a negative current.

At time $t_{11}$, high side drive signal $V_{HS\_DRV}$ remains at a logic low voltage level and low side drive signal $V_{LS\_DRV}$ transitions from a logic high voltage level to a logic low voltage level. Low side drive signal $V_{LS\_DRV}$ being at a logic low voltage level turns off switching transistor 104 which causes switch node voltage $V_{SWN}$ at node 20 to increase to voltage level $V_{SWN\_HL}$. This causes inductor current $I_{L18}$ to become less negative, i.e., to increase.

At time $t_{12}$, inductor current $I_{L18}$ becomes zero causing switching node voltage $V_{SWN}$ to oscillate about its nominal voltage $V_{SWN\_NOM}$ before settling to its nominal voltage.

This process continues, i.e., using signals $V_{SWN}$ and $V_{PWM}$ to generate counter increment signals, until threshold voltage $V_{TH}$ appearing at input terminal 46 of comparator 24 is sufficiently lowered so that low side switching transistor 104 turns off when inductor current $I_{L18}$ reaches zero or substantially zero.

It should be noted that the operation has been described in using signals $V_{SWN}$ and $V_{PWM}$ to change, i.e., increase or decrease, threshold voltage $V_{TH}$. However, a similar concept applies to embodiments such as those shown in FIGS. 1-3 in which signals $V_{HS\_DRV}$, $VB_{HS\_DRV}$, $V_{LS\_DRV}$, $VB_{LS\_DRV}$, $V_{POR}$, $V_{SFT\_OK}$, and $V_{NO\_FAULT}$ are used in place of pulse width modulation signal $V_{PWM}$ to change threshold voltage $V_{TH}$.

By now it should be appreciated that a power supply converter circuit and a method for adjusting its operation have been provided. The converter circuit monitors voltage signal $V_{SWN}$ at node 20 or current $I_{L18}$ flowing from node 20 to determine whether the voltage or current are positive, negative or zero. If voltage signal $V_{SWN}$ or current signal $I_{L18}$ are nonzero, threshold voltage $V_{TH}$ appearing at input terminal or node 46 of ZCD comparator 24 is adjusted up or down. Threshold voltage $V_{TH}$ is adjusted up or increased if the voltage $V_{SWN}$ is negative or current $I_{L18}$ is positive and threshold voltage $V_{TH}$ is adjusted down or decreased if voltage $V_{SWN}$ is positive or current $I_{L18}$ is negative. Among other things, this improves the efficiency of the power supply converter circuit.

Although specific embodiments have been disclosed herein, it is not intended that the invention be limited to the disclosed embodiments. Those skilled in the art will recognize that modifications and variations can be made without departing from the spirit of the invention. For example, the switching network can be used with other types of converters such as, for example, boost converters, buck-boost converters, etc. It is intended that the invention encompass all such modifications and variations as fall within the scope of the appended claims.

What is claimed is:

1. A method for adjusting the operation of a semiconductor component, comprising:
   providing a low side semiconductor device having a control electrode and first and second current conducting electrodes;
   providing a high side semiconductor device having a control electrode and first and second current conducting electrodes, wherein the first current conducting electrode of the low side semiconductor device is coupled to the second current conducting electrode of the high side semiconductor device to form a first node;
   generating a first drive signal in response to comparing a first signal at the first node with a second signal at a second node, the first drive signal for driving the low side semiconductor device;
   changing an operating state of the low side semiconductor device;
   monitoring the first signal at the first node and in response to the first signal being one of greater than or less than the second signal:
      generating a first comparison signal in response to comparing the first signal with a first reference signal and generating a second comparison signal in response to comparing the first signal with a second reference signal;
      using the first and second comparison signals to generate an adjusted second signal at the second node, wherein using the first and second comparison signals includes one of:
      generating a counter increment signal from a first flip-flop in response to the first comparison signal and a pulse width modulation signal or generating a counter decrement signal from a second flip-flop in response to the second comparison signal and the pulse width modulation signal;

comparing the first signal with the adjusted second signal to generate the first drive signal for the low side semiconductor device.

2. The method of claim 1, further including using the first signal at the first node to determine whether a current is positive or negative.

3. A method for adjusting a threshold voltage, comprising:
providing a switching transistor having a control terminal and first and second current conducting terminals, the first current conducting terminal coupled to an energy storage element at a first node;
generating a first drive signal in response to comparing a first voltage at the first node with a second voltage at a second node, the first drive signal for driving the switching transistor;
turning off the switching transistor;
in response to the first voltage at the first node being one of a negative voltage or a positive voltage:
after turning off the switching transistor, comparing the first voltage at the first node with first and second reference voltages to generate first and second comparison voltages, respectively;
changing a counter output signal in response to the first and second comparison voltages by:
generating a counter increment signal from a first flip-flop in response to the first comparison signal and a pulse width modulation signal or generating a counter decrement signal from a second flip-flop in response to the second comparison signal and the pulse width modulation signal;
adjusting the second voltage at the second node in response to the counter increment signal or a counter decrement signal to generate an adjusted second voltage;
comparing the first voltage at the first node with the adjusted second voltage to generate an adjusted comparison signal; and
changing a turnoff time of the switching transistor in response to the adjusted comparison signal.

4. The method of claim 1, wherein changing the operating state of the low side semiconductor device includes turning off the low side semiconductor device.

5. The method of claim 1, wherein monitoring the first signal at the first node and in response to the first signal being one of greater than or less than the second signal includes the first signal at the first node being greater than the second signal and wherein using the first and second comparison signals to generate the adjusted second signal at the second node includes decreasing the second signal to generate the adjusted second signal.

6. The method of claim 1, wherein monitoring the first signal at the first node and in response to the first signal being one of greater than or less than the second signal includes the first signal at the first node being less than the second signal and wherein using the first and second comparison signals to generate the adjusted second signal at the second node includes increasing the second signal to generate the adjusted second signal.

7. The method of claim 1, wherein monitoring the first signal at the first node and in response to the first signal being one of greater than or less than the second signal includes the first signal at the first node being less than the second signal and wherein using the first and second comparison signals to generate the adjusted second signal at the second node includes using the adjusted second control signal to delay turning off the low side semiconductor device.

8. The method of claim 1, wherein monitoring the first signal at the first node and in response to the first signal being one of greater than or less than the second signal includes the first signal at the first node being greater than the second signal and wherein using the first and second comparison signals to generate the adjusted second signal at the second node includes using the adjusted second control signal to hasten turning off the low side semiconductor device.

9. The method of claim 3, wherein changing the turnoff time of the switching transistor includes moving the turnoff time to an earlier time.

10. The method of claim 3, wherein changing the turnoff time of the switching transistor includes moving the turnoff time to a later time.

11. The method of claim 3, further including generating the adjusted comparison signal so that a current flowing through the energy storage element coupled to the first node is approximately zero.

12. The method of claim 3, wherein adjusting the second voltage at the second node includes increasing the second voltage.

13. The method of claim 3, wherein adjusting the second voltage at the second node includes decreasing the second voltage.

14. The method of claim 1, wherein generating the counter increment signal from the first flip-flop in response to the first comparison signal and the pulse width modulation signal or generating the counter decrement signal from the second flip-flop in response to the second comparison signal and the pulse width modulation signal includes generating an output signal from a counter and converting the output signal from the counter into an analog counter-output signal.

15. The method of claim 14, further including generating the adjusted second signal in response to the analog counter-output signal.

16. The method of claim 1, further including generating a clocking signal for the first flip-flop by logically ANDing the counter decrement signal with the first comparison signal.

17. The method of claim 1, further including generating a clocking signal for the second flip-flop by logically ANDing the counter increment signal with the second comparison signal.

18. The method of claim 3, wherein generating the counter increment signal from the first flip-flop in response to the first comparison signal and the pulse width modulation signal or generating the counter decrement signal from the second flip-flop in response to the second comparison signal and the pulse width modulation signal includes generating an output signal from a counter and converting the output signal from the counter into an analog counter-output signal.

19. The method of claim 18, further including generating a clocking signal for the first flip-flop by logically ANDing the counter decrement signal with the first comparison signal.

20. The method of claim 18, further including generating a clocking signal for the second flip-flop by logically ANDing the counter increment signal with the second comparison signal.

* * * * *